United States Patent
Hassler et al.

Patent Number: 5,404,164
Date of Patent: Apr. 4, 1995

[54] PROCESS AND DEVICE FOR CONVERGENCE MEASUREMENT IN A COLOR PICTURE TUBE

[75] Inventors: Joachim Hassler, Esslingen; Zeljko Sernhorst, Celle; Günter Wessels, Stuhr, all of Germany

[73] Assignee: Nokia Technology GmbH, Pforzheim, Germany

[21] Appl. No.: 73,313

[22] Filed: Jun. 8, 1993

[30] Foreign Application Priority Data

Jun. 16, 1992 [DE] Germany .............. 42 19 641.8

[51] Int. Cl.⁶ .............. H04N 17/00; H04N 17/02
[52] U.S. Cl. .............. 348/182; 348/188
[58] Field of Search .............. 358/10, 139, 93; H04N 17/00, 17/02; 348/180, 181, 182, 188, 263

[56] References Cited

U.S. PATENT DOCUMENTS

| | | | |
|---|---|---|---|
| 4,093,960 | 6/1978 | Estes | 358/10 |
| 4,628,342 | 12/1986 | Desmons et al. | 358/10 |

FOREIGN PATENT DOCUMENTS

| | | | |
|---|---|---|---|
| 0087652 | 9/1983 | European Pat. Off. | H04N 17/04 |
| 0442685 | 8/1991 | European Pat. Off. | H04N 17/04 |
| 144491 | 6/1987 | Japan | H04N 17/00 |

OTHER PUBLICATIONS

Prospects of the Company, "Innovationstechnik, Brenden".

Primary Examiner—Victor R. Kostak
Assistant Examiner—Glenton B. Burgess
Attorney, Agent, or Firm—Ware, Fressola, Van der Sluys & Adolphson

[57] ABSTRACT

A color TV convergence measurement device and process for measuring a position of an electron beam of a multiple-beam color picture tube relative to a field of view of an image converter, in which an electron beam generation system provides the electron beam which generates a brightness distribution pattern on a screen of a tube, the screen has phosphor stripes for different colors, and a shadow mask is arranged in front of the screen and has elongated slots in the direction of the phosphor stripes. The process includes generating a predefined electron distribution pattern on the shadow mask; recording an associated brightness distribution pattern on the screen using the image converter which converts the brightness distribution pattern into an electrical charge pattern; and analyzing the charge pattern to obtain a value for a variable characterizing the position of the charge pattern within the field of view of the image converter; generating the electron distribution pattern with dimensions on an order of a few millimeters and with at least one edge extending obliquely to the direction of elongation of the mask slots; and generating the associated brightness distribution pattern on the image converter so that it fits completely into the field of view.

11 Claims, 10 Drawing Sheets

PROCESS AND DEVICE FOR CONVERGENCE MEASUREMENT IN A COLOR PICTURE TUBE

The following concerns a process and a device for measuring the position of an electron beam of a multiple-beam color picture tube relative to the field of view of an image converter.

In practice, such processes and devices are used to define convergence errors and vertical raster offsets. In convergence measurements, the positions of raster lines generated by at least two electron beams are measured. The deviation between the positions indicates the convergence error. With vertical raster offset, a determination is made as to how far a horizontal raster line deviates vertically from the horizontal center line of a color picture tube.

Prior Art

To measure convergence and vertical raster position, a device of the company called Innovationstechnik Gesellschaft für Automation m.b.H., Bremen, DE, has been available commercially for several years; this device is illustrated below with reference to FIGS. 7 and 8. The process that is performed with this device is explained with reference to FIGS. 9 and 10.

Figure 7:
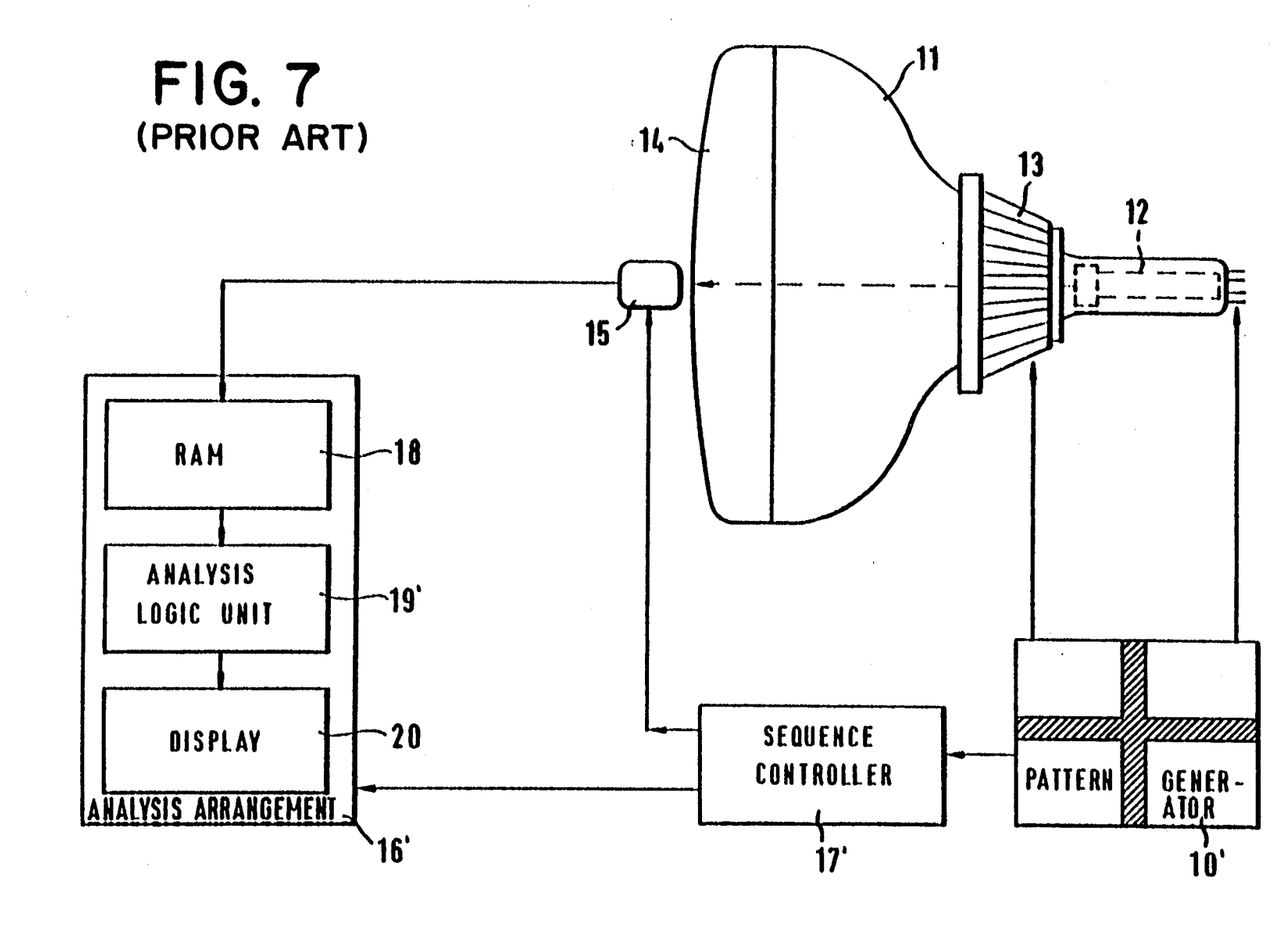
FIG. 7 is a depiction corresponding to that of FIG. 1, but for the known device already explained.

The known device according to FIG. 7 has a pattern generator 10' that drives an electron beam generating system 12 arranged in the neck of a color picture tube 11, and a deflector 13. The image generated on the screen 14 of the tube is recorded by an image converter camera 15, and analyzed by an analysis arrangement 16'. The sequences occurring over time in the pattern generator 10', the image converter camera 15, and the analysis arrangement 16' are controlled by a sequence controller 17'. The analysis arrangement 16' has a RAM 18, an analysis logic unit 19', and a display 20.

Figure 8:
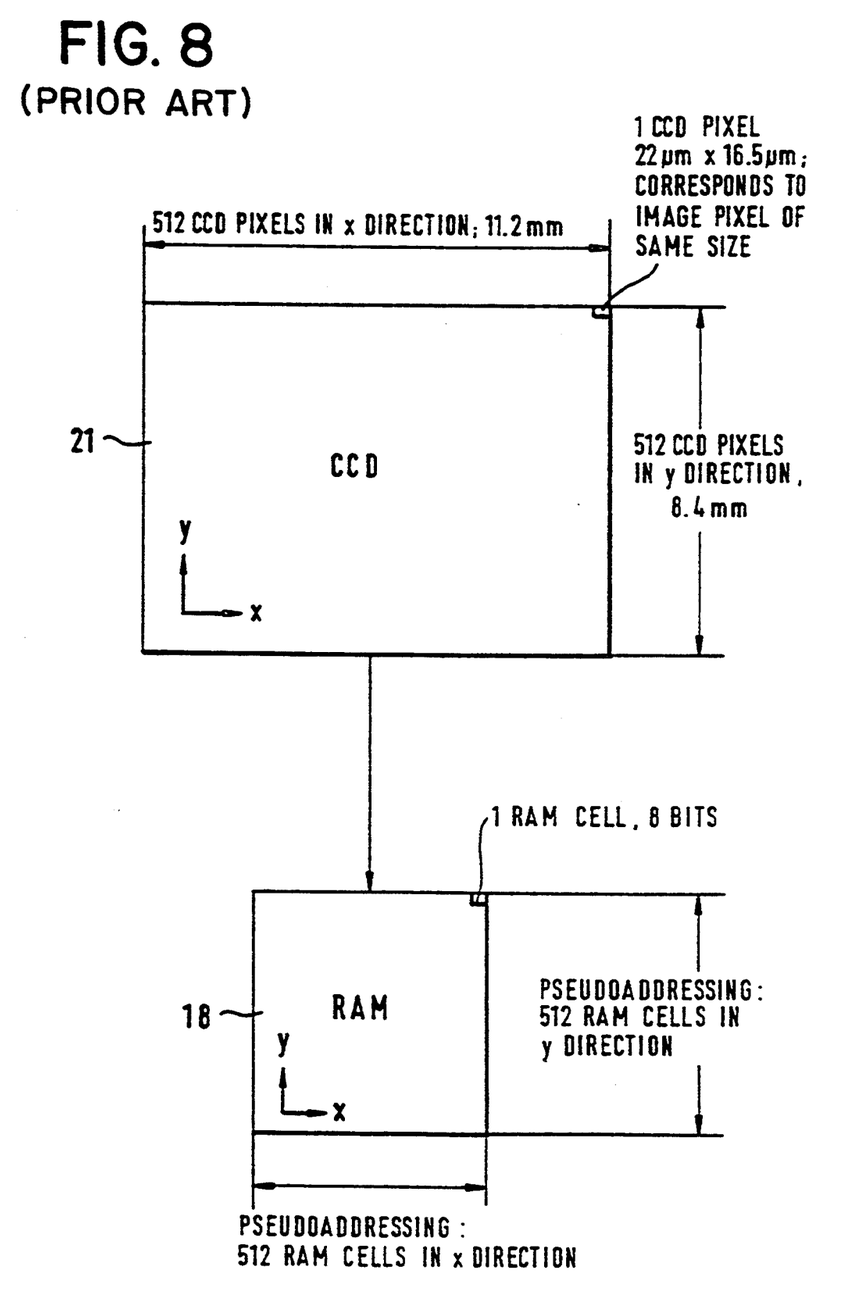
FIG. 8 is a schematic depiction of a CCD image converter and an associated RAM in the device according to FIG. 7.

Arranged in the image converter camera 15 is a CCD converter 21, whose structure is illustrated by FIG. 8. Under control of the sequence controller 17, the charges stored in the pixels of the CCD converter 21 are read out, and digital 8-bit values are assigned to the charge quantities. One RAM cell corresponds to each CCD pixel. The pseudoaddressing of the RAM 18 is such that the arrangement of the RAM cells corresponds to the arrangement of the CCD pixels. It is immediately evident from this that the information pattern stored in the RAM corresponds directly to the charge pattern previously stored in the CCD, and thus to the brightness distribution pattern generated on the screen 14. The RAM has a capacity of $2^{18}$ cells of 8 bits each, equal to 256 kilobytes.

Figure 9:
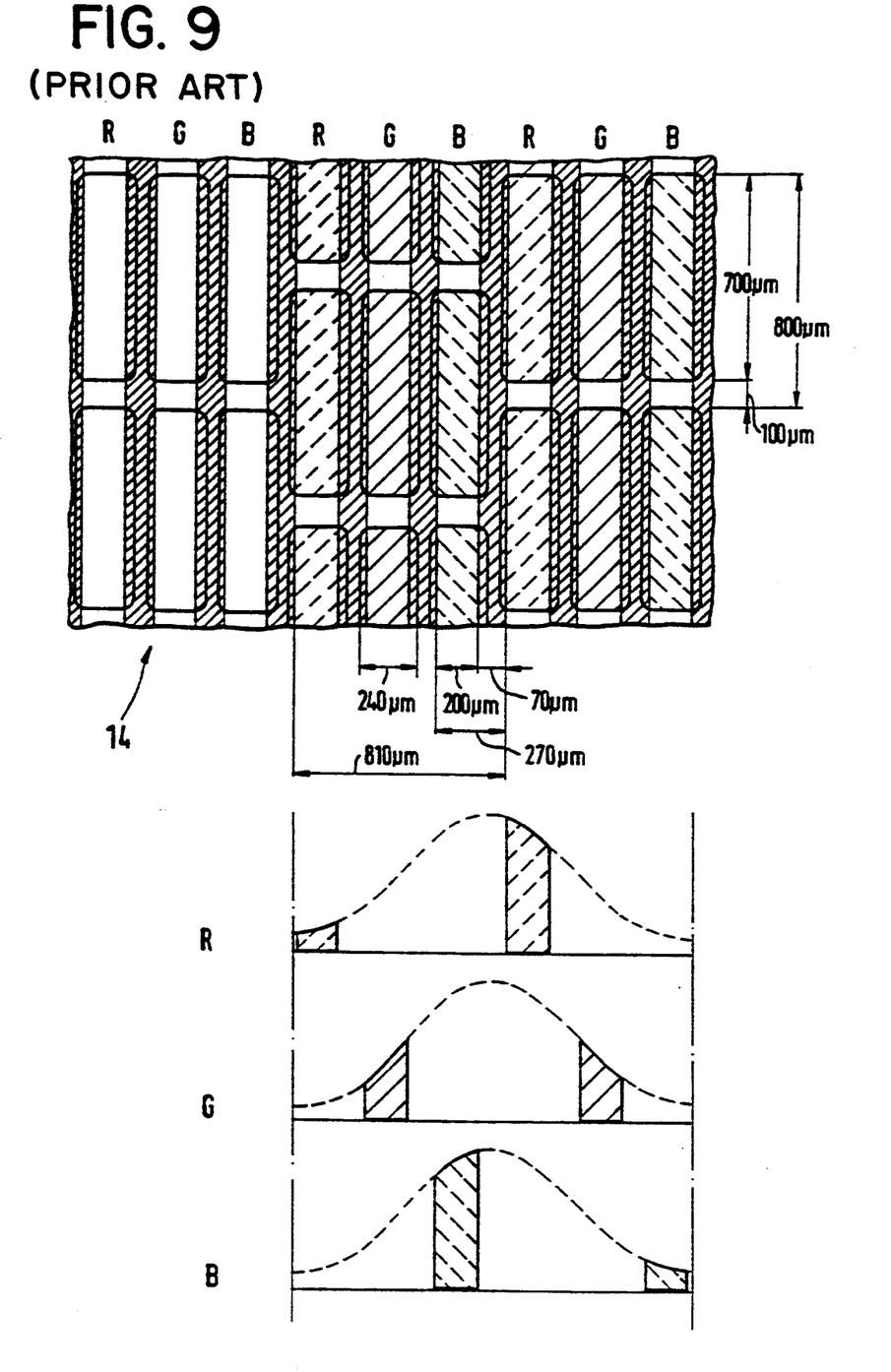
FIG. 9 is a depiction of phosphor stripes and luminous spots on a screen, and of associated brightness measurements.

The pattern generated by the pattern generator 10' is an ordinary grid pattern, consisting of one horizontal and one vertical line for each of the three colors of a color picture tube. FIG. 9 illustrates how the vertical line looks on the luminescent screen 14.

The luminescent screen 14 consists of phosphor stripes R, G, and B, and of matrix stripes located between them, which in FIG. 9 are indicated by closely spaced crosshatching. At points where electron spots strike the luminescent screen and phosphor stripes are present, luminescence occurs in the luminescent color of the phosphor stripe. Domains that emit red light are identified in FIG. 9 by dashed hatching towards the upper right, green-emitting domains by continuous hatching, and blue-emitting domains by hatching towards the lower right. Each luminous spot has a width of 200 um and a height of 700 $\mu$m. Horizontally, luminous spots belonging to the same color are separated by 810 $\mu$m, while vertically they are separated from each other by only 100 $\mu$m. These values apply to the center of a luminescent screen. The phosphor stripes and matrix stripes become wider towards the outer edges. If no matrix stripes are present, similar size ratios apply. In this case the phosphor stripes are separated from one another by uncoated stripes, and the electron spots strike within the phosphor stripes.

The lower half of FIG. 9 illustrates the image created by a vertical raster line as a function of the luminous spot. The beam scans down the screen 14, being pulsed in each case at a specific position - or more precisely at a specific time after a horizontal synchronization pulse - and is then blocked again. Its intensity thus increases and then decreases. The intensity profile beginning at about 10% of maximum brightness is depicted in the lower portion of FIG. 9. It is evident that in the case of FIG. 9, when considered in detail, two red vertical stripes, two green vertical stripes, and two blue vertical stripes are generated, each with differing intensities. If the screen is observed from a certain distance, for example from 1 meter away, the individual colored stripes are no longer noticeable, and instead a single white bar appears. However, this is true only if the intensity profiles for the three beams are identical to one another, as depicted in FIG. 9. If, on the other hand, the electron beam that excites the red phosphor stripes (hereafter referred to as the red electron beam), is offset to the left with respect to the electron beam that excites the green phosphor stripes (hereafter referred to as the green electron beam), and if the electron beam that excites the blue phosphor stripes (hereafter referred to as the blue electron beam) were offset to the right with respect to the green electron beam, three colored raster stripes, separated spatially from one another, would appear, each consisting, upon closer inspection, of two stripes separated from one another by 810 $\mu$m. In the case of FIG. 9, the three electron beams converge horizontally, while in the case just described they do not converge.

The device according to FIG. 7 determines the position of the electron beams by determining the brightness center point of the luminous spot domains generated by a particular electron beam. It implements a process with the following steps:

- generate a predefined electron distribution pattern on the shadow mask;
- record the associated brightness distribution pattern on the screen using the aforesaid image converter, which converts the brightness distribution pattern into an electrical charge pattern; and
- analyze the charge pattern to obtain a value for a variable characterizing the position of the charge pattern within the field of view of the image converter.

Figure 10A:
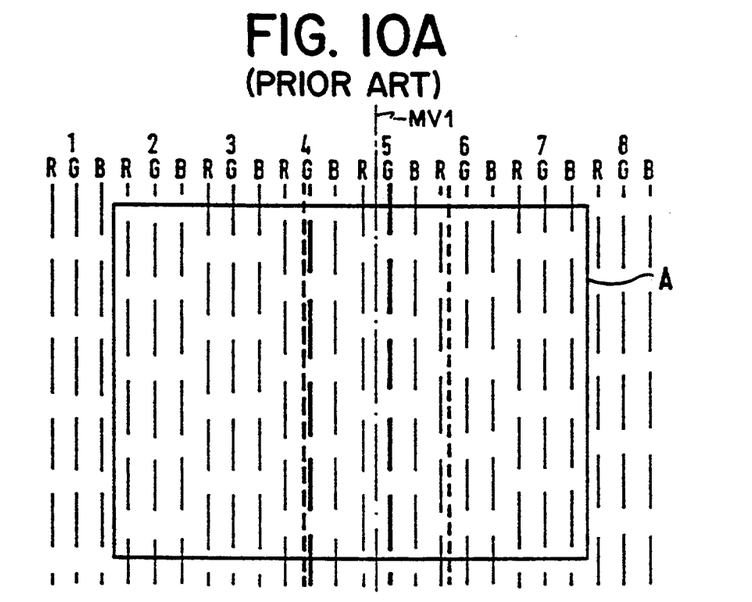
FIGS. 10a, b, c, d are depictions corresponding to those of FIGS. 2a, b, c, d, but using a conventional pattern.
Figure 10B:
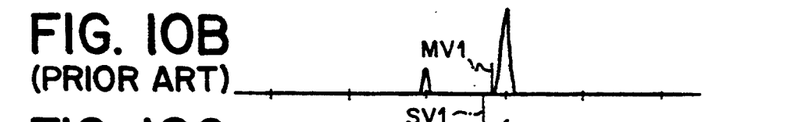
Figure 10C:
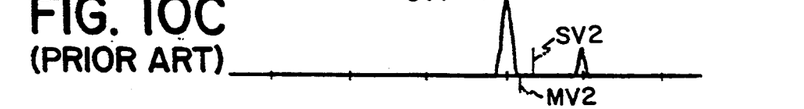

This process is illustrated by FIGS. 10a, b, and c.

FIG. 10a concerns the case in which the raster width of an electron beam within which the beam has an intensity of at least 10% of its maximum intensity over that width is somewhat less than twice the distance between two adjacent phosphor stripes of the same color. In this context, the vertical raster stripes depicted are located so that a green phosphor stripe is located approximately at the center of its width, while a second stripe is located exactly at the edge. These stripes are labeled G5 and G4. The associated luminous spots are depicted as thick vertical bars. Potential luminous spots that nonetheless are not being excited to luminesce at the time, are depicted by thin vertical bars.

FIG. 10b shows the brightness distribution as measured by means of the CCD image converter 21 along a horizontal line, summing over all the signals over a predefined number of pixels in the vertical direction. Relatively high brightness results in the region of the phosphor stripe G5, but lower brightness in the region of the phosphor stripe G4. The center point of the brightness distribution is labeled SV1.

Figure 10D:
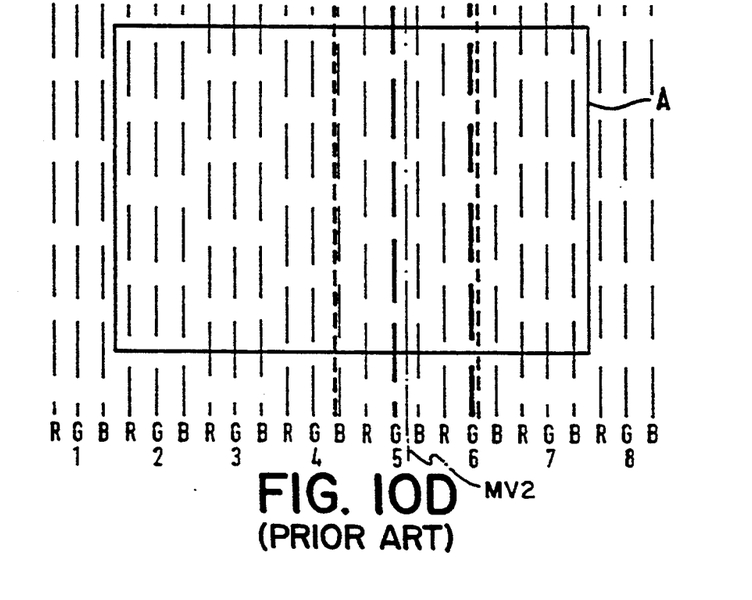

FIG. 10d is very similar to FIG. 10a, but with the difference that the aforesaid electron beam has been displaced somewhat to the right, specifically so that its vertical center line now occupies the position MV2 rather than the position MV1 in FIG. 10a. Thus the phosphor stripe G4 is no longer located in the said intensity region, but instead the phosphor stripe G6 is being excited to produce perceptible luminescence. The associated brightness distribution, as measured by the CCD image converter 21, is depicted in FIG. 10c. The resulting center point of the brightness profile is the location SV2.

The displacement between the center points SV1 and SV2 is considerably greater than the actual displacement of the center of the electron beam from center line MV1 to center line MV2. Despite the small displacement, the measured location changes abruptly and relatively strongly. The reason is that most of the raster line written by the electron beam is not detected at all; instead, only those small regions that actually strike a phosphor stripe produce visible luminescence. If, in a case according to FIG. 10a, a phosphor stripe to the left of a center phosphor stripe is still just being struck, but if with a slight displacement to the right that stripe on the left is no longer struck, while instead a stripe to the right of the center phosphor stripe is suddenly being struck, this means a displacement of 1.6 mm in those luminescent areas that are present in addition to those of the center stripe.

The apparent jump of a vertical raster stripe resulting from only a slight displacement thereof, as illustrated with reference to FIGS. 10a and d, is also quite evident when this same raster stripe is not recorded with the CCD converter 21, but observed with the naked eye. It is particularly striking when the raster stripe is narrow. It is less evident, however, when the raster stripe is wide; and in terms of the distribution of the brightness center point as well, the disappearance of a luminous stripe on one side and the appearance of a new luminous stripe on the other side has hardly any effect when averaged over the brightness of the light from many luminous stripes. In this case, however, displacements can be detected only with low sensitivity. The result is that raster stripes a few millimeters wide are used both for adjustment using the naked eye, and for adjustment using a CCD image converter with the device according to FIG. 7.

These stripes represent a good compromise between sensitivity and interference due to the "jump" effect mentioned earlier.

In the vertical direction, the errors that can occur in unfavorable cases when the electron beam is displaced are less critical, since the luminous spots are 700 μm high in the vertical direction, but separated from each other by only 100 μm. The ratio between luminous and non-luminous domains is therefore 7:1, while horizontally it is 2:8, which means a difference of a factor of 28 (in terms of the correlation between measured and actual beam displacements) to the disadvantage of the measurement in the horizontal direction. Because of these unfavorable circumstances in the horizontal direction, the known device is not capable of measuring horizontal convergence errors with sufficient accuracy.

Accordingly, the problem that existed was to indicate a device and a process for measuring the position of an electron beam of a multiple-beam color picture tube that can additionally determine the position of the electron beam in the horizontal direction with high accuracy.

SUMMARY OF THE INVENTION

The process according to the invention possesses the steps listed above of the known process, and is characterized in that the electron distribution pattern generated is one that has dimensions on the order of a few millimeters, and in which at least one edge extends obliquely in the direction of elongation of the mask slots; and that the associated brightness distribution pattern is imaged on the image converter so that it fits completely into its field of view.

The device according to the invention possesses the functional groups of the device described with reference to FIG. 7, and is characterized in that the pattern generator is designed so that it generates an electron distribution pattern that has dimensions on the order of a few millimeters, and in which at least one edge extends obliquely to the direction of elongation of the mask slots; and the image converter camera is designed so that it images the brightness distribution pattern on the image converter in such a way that it fits completely into its field of view.

The process according to the invention is based on the realization that abrupt changes in the center point of the brightness distribution detected by the CCD image converter can be eliminated if the influence of luminescence effects on the measurement decreases from the center to the edge of the brightness pattern due to the shape of the pattern. This is ensured by patterns in which at least one edge runs obliquely to the direction of elongation of the mask slots. Preferably the pattern is a square standing on one vertex, or some other pattern in which all the edges run obliquely to the mask slots. When such a pattern is moved horizontally over the screen, and when a new phosphor stripe enters the pattern or one that was previously present moves out of the pattern, this has hardly any effect, since the height of the pattern in these outer regions is very small. In addition, due to the oblique orientation of the pattern edge, the influence of an edge stripe becomes weaker and weaker with increasing displacement of the pattern, until ultimately it moves out of the pattern. With conventional patterns, however, a stripe is either present over its entire length within the pattern, or it is not contained in the pattern.

One very particular advantage of the process and the device according to the invention is that they can be designed so that the convergence relationships of all the electron beams within a color picture tube, both horizontal and vertical, can be detected with a single measurement.

BRIEF DESCRIPTION OF THE DRAWINGS

FIG. 3d is a depiction corresponding to that of FIG. 3a, but for a pattern displaced slightly downward compared to the position of FIG. 3a;

FIG. 4a is a depiction of a pattern inside the field of view of a CCD converter, with lines perpendicular to one another which extend parallel to the edges of the pattern and by means of which the pattern position is determined being additionally drawn in;

Concerning the prior art:

BEST MODE FOR CARRYING OUT THE INVENTION

Figure 1:
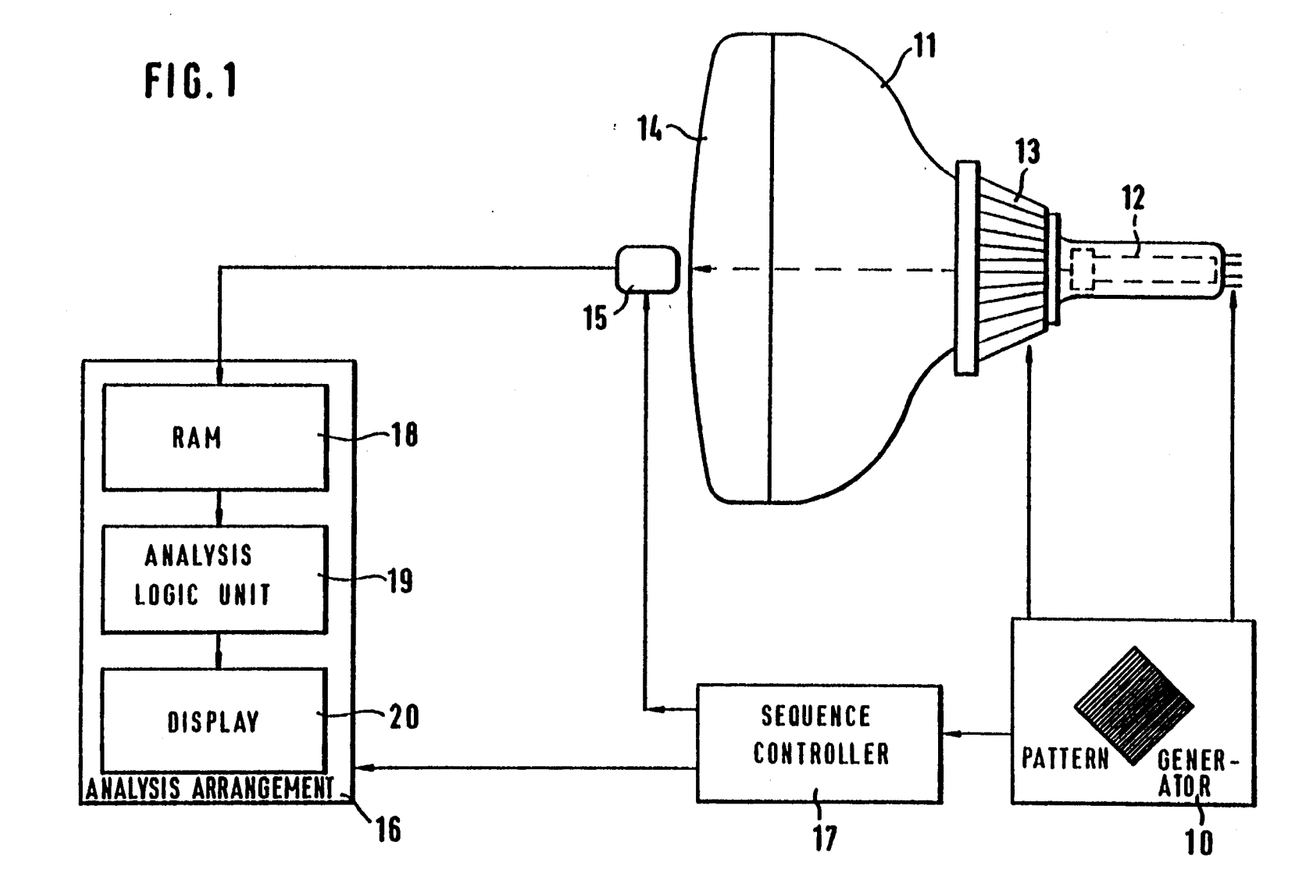
FIG. 1 is a schematic depiction of a color picture tube and a device for measuring the convergence and the raster position of electron beams of that tube.

The device in accordance with the invention according to FIG. 1 is constructed essentially like that of FIG. 7, but differs from the latter by having different functions for the pattern generator, the sequence controller, and the analysis logic unit, and therefore for the analysis arrangement as well, for which reason these functional groups now bear the reference numbers 10, 17, 19, and 16 rather than 10', 17', 19', and 16', respectively.

Figure 2A:
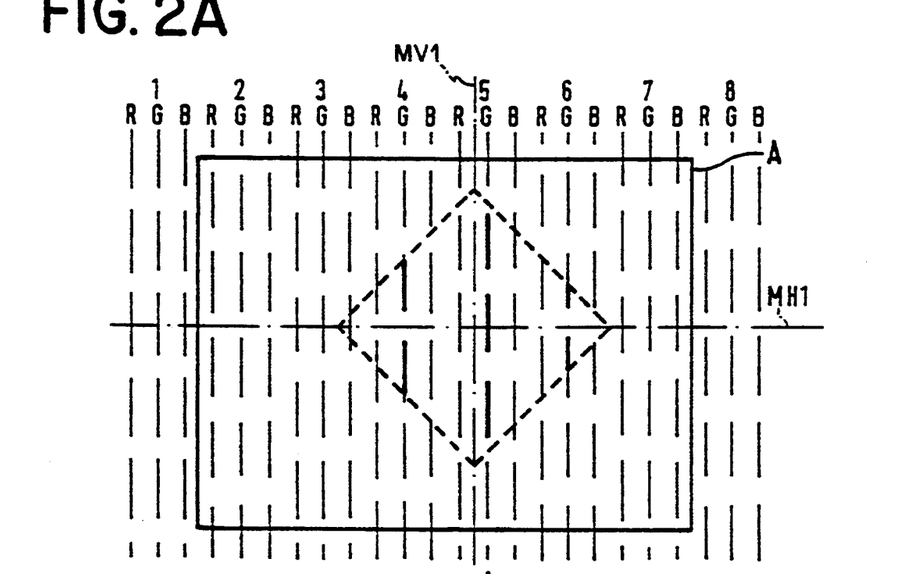
FIG. 2a is a schematic depiction of a square luminous spot pattern standing on one vertex, as imaged on a CCD image converter.
Figure 2B:
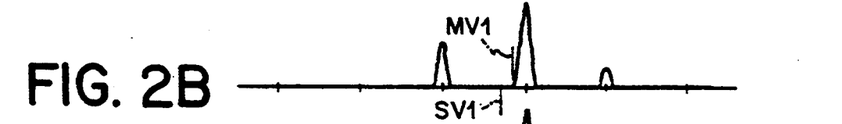
FIG. 2b is a depiction of the brightness distribution along a horizontal line of the image converter.
Figure 2C:
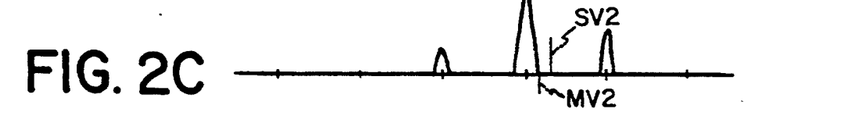
FIG. 2c is a depiction corresponding to that of FIG. 2b, but for the pattern position according to FIG. 2d.
Figure 2D:
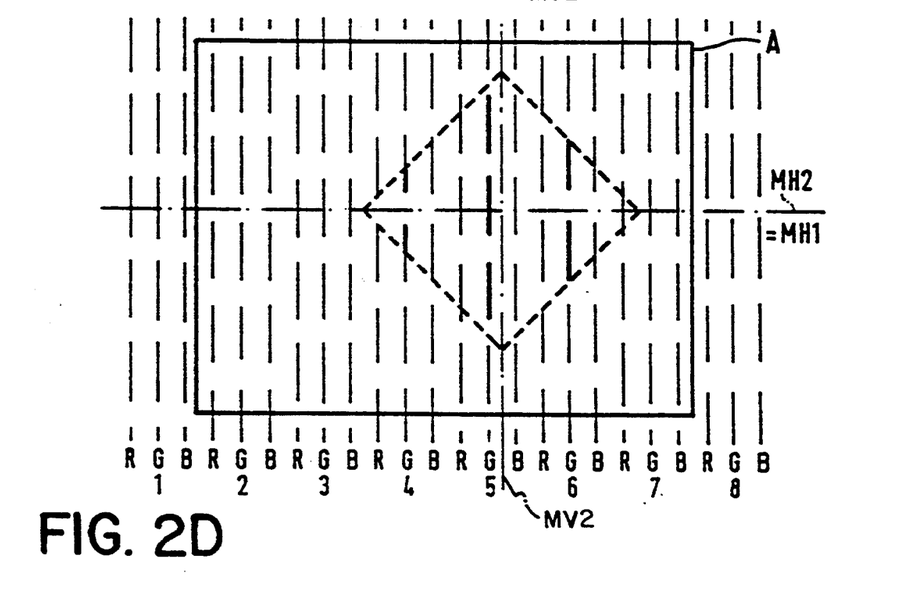
FIG. 2d is a depiction corresponding to that of FIG. 2a, but for a pattern displaced slightly to the right.
Figure 3A:
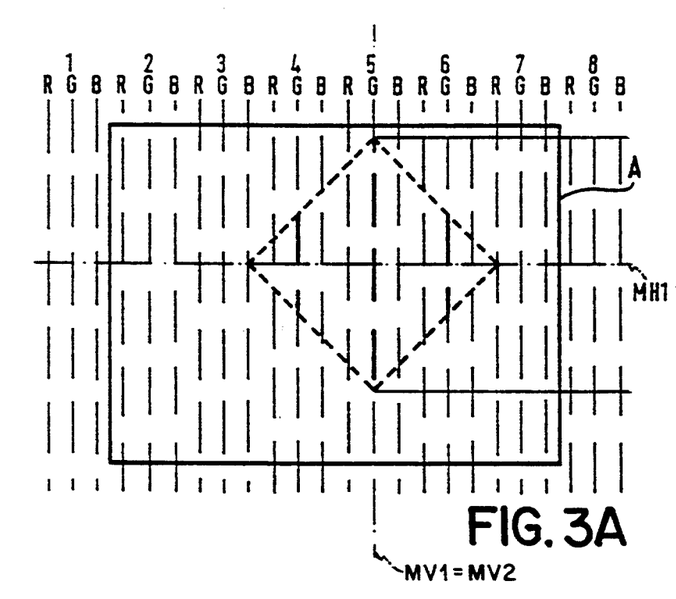
FIG. 3a is a depiction corresponding to that of FIG. 2a, but for a pattern displaced somewhat to the right.
Figure 3B:
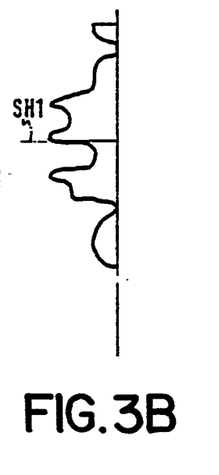
FIG. 3b is a depiction corresponding to that of FIG. 2b, but for the brightness distribution in the vertical direction.
Figure 3C:
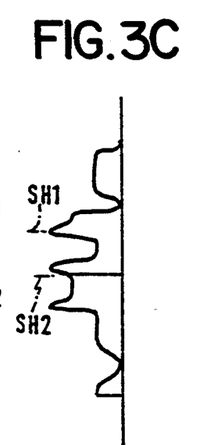
FIG. 3c is a depiction corresponding to that of FIG. 3b, but for the pattern position according to FIG. 3d.
Figure 3D:
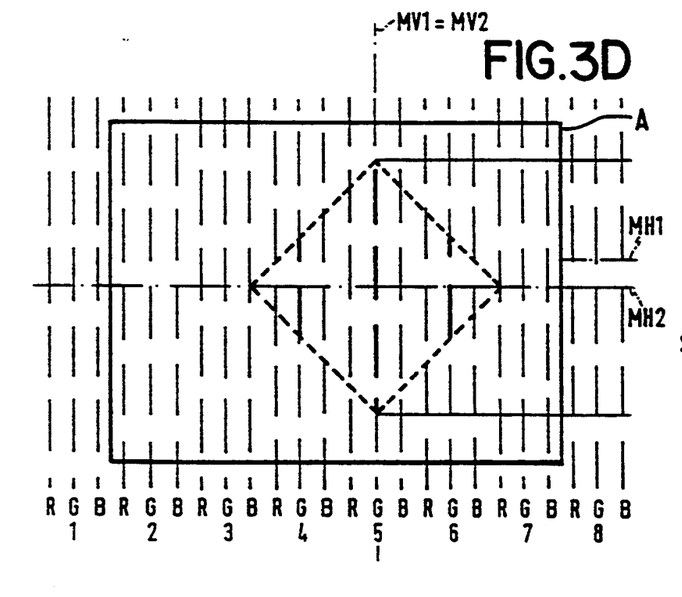

As is evident from FIG. 2a, the color picture tube 11 is driven by the pattern generator 10 so that it generates a pattern of a square standing on one vertex. This pattern has an edge length of a few millimeters, for example 4 mm, which is the case for reasons corresponding to those governing the choice of a stripe width of a few millimeters for the raster stripes conventionally used. At this size, the pattern fits well into the field of view A of the CCD image converter according to FIG. 8. The associated brightness distribution in the horizontal direction is plotted in FIG. 2b. If a slight displacement to the right occurs, the luminous spot generated on the phosphor stripe G6 becomes somewhat longer, while the spot generated on the stripe G4 becomes somewhat shorter. If displacement to the right were to continue, as depicted in FIG. 2d, the luminous spot on the stripe G4 would be shortened even further, until ultimately it would disappear. This represents a gradual disappearance, and not a sudden disappearance as in the case where the known pattern is used, as described with reference to FIG. 10. It is correspondingly true that new luminous spots on the right side do not suddenly appear over their full length; instead, when a new phosphor stripe is reached, first of all short luminous spots appear, and these then become longer and longer as displacement to the right continues. Luminous spots therefore cannot suddenly appear over the entire length of the field of view of the CCD image converter. These gradual changes in brightness are also evident from the depictions of the brightness profiles of FIGS. 2b and 2c, which correspond to the pattern positions according to FIGS. 2a and 2d, respectively.

FIGS. 3a to 3d similarly illustrate the situation when a square pattern standing on one vertex is displaced downward. Once again, luminous spots become smaller and smaller until ultimately they are cut off. Thus with displacements in the y direction as well, changes in brightness distribution occur without major jumps.

Figure 4A:
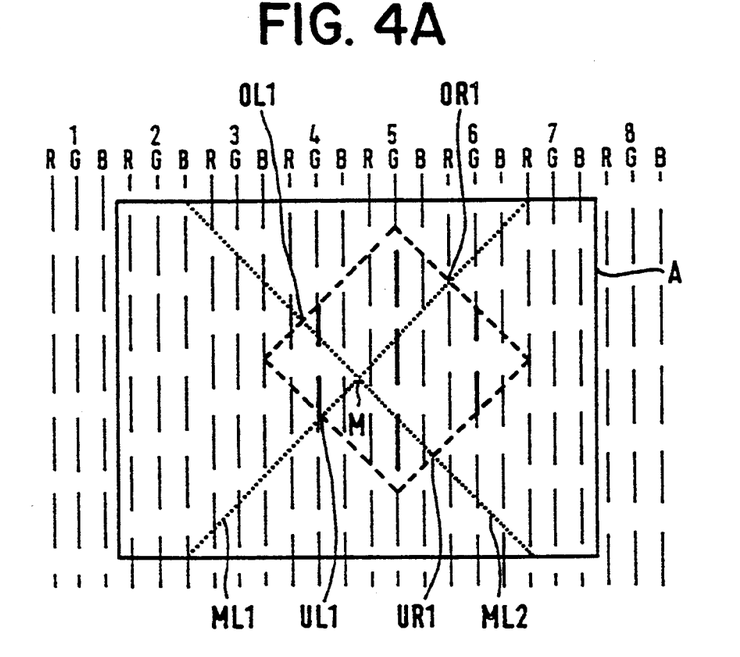
Figure 4B:
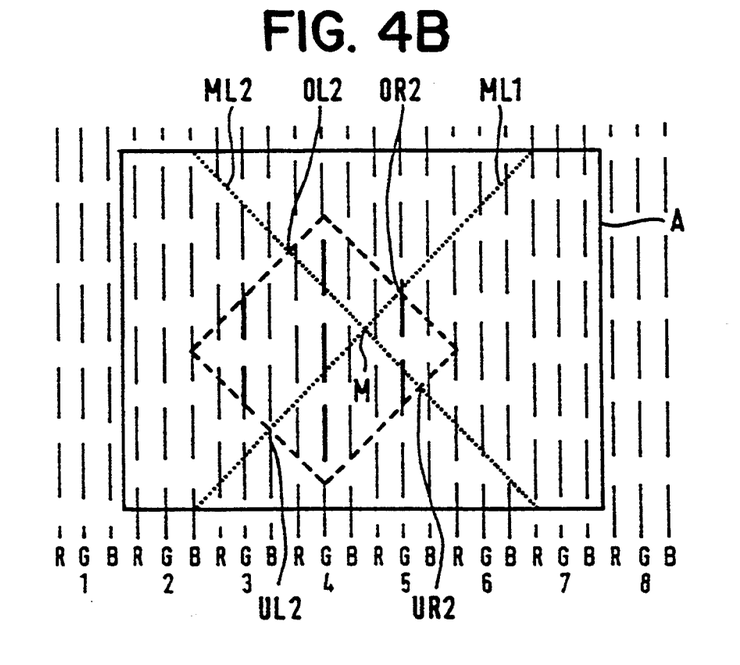
FIG. 4b is a depiction corresponding to that of FIG. 4a, but for a different pattern position.

FIG. 4 illustrates that the center point of the brightness distribution does not necessarily have to be used in order to measure the displacement of the pattern. According to FIG. 4, two measurement lines ML1 and ML2, perpendicular to one another and extending parallel to the edges of the square pattern, are instead overlaid in the image detected by the CCD image converter 21. If the brightness analysis is moved along the measurement line ML1 from bottom to top, and if all the brightness values that occur on a line extending perpendicular to the measurement line ML1 are summed, the lower end of the luminous spot on the phosphor stripe G4 is observed at point UL1. Proceeding with the said signal acquisition process, brightness values continue to be detected until ultimately point OR1 is reached, at which, looking perpendicular to the line ML1, a pixel belonging to a luminous spot is perceived for the last time. The points UL1 and OR1 characterize the lower left and upper right edges, respectively, of the pattern. Correspondingly, when proceeding along the measurement line ML2, two points UR1 and OL1 are detected, identifying the lower right and upper left edges, respectively, of the pattern. If the pattern is then displaced as depicted in FIG. 4b, measurement points UL2 and OR2 as well as UR2 and OL2 are detected. The displacements along the measurement lines are thereby defined; and because of their 45° angle to the x direction, these displacements can easily be converted into x and y displacements. The said analyses involving proceeding in the direction of the measurement lines and summing all the pixel values in each line perpendicular to the measurement line can easily be effected using the RAM 18, by calculating the pseudoaddresses in the said directions and then reading out the RAM cells under the respective pseudoaddresses.

It is also worth noting, with regard to the analysis variants illustrated by FIG. 4, that luminous spots gradually enter the pattern and gradually exit from it, for which reason there are no sudden, abrupt changes in measurement points UL, UR, OR, and OL as the pattern is displaced.

FIGS. 2 to 4 were used to illustrate that the particular position being measured as the pattern is continuously displaced also changes continuously, and not at times abruptly. This is also true when what is used is not a square standing on one vertex, but some other pattern with edges running obliquely to the mask slots, which guarantees that luminous spots will gradually enter the pattern and gradually exit from it. What is essential for practical applications is the fact that this continuous relationship between actual and observed displacement guarantees very precise position measurement.

Figure 5:
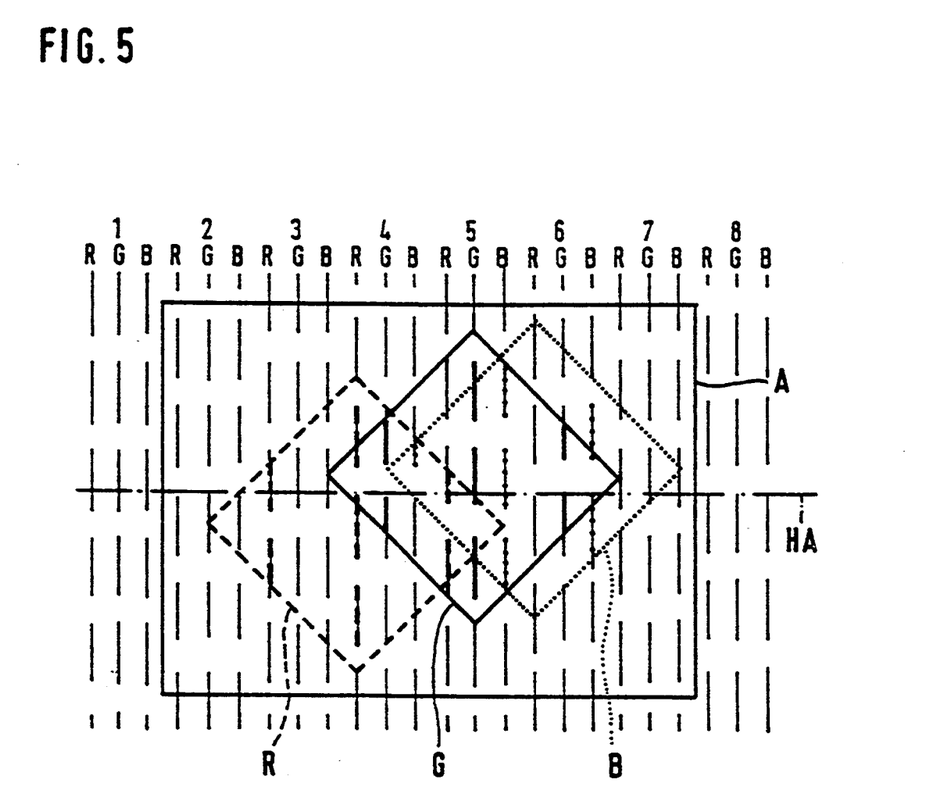
FIG. 5 is a depiction of partly overlapping patterns in the field of view of an image converter, with each pattern belonging to one of three different electron beams.

In practical applications, what is of interest in the x direction is not measuring the position of an individual electron beam, but determining the positions of a plurality of electron beams with respect to each other. This is illustrated in FIG. 5. Each of three electron beams in a color picture tube generates the pattern of a square standing on its vertex. The pattern written by the green beam is surrounded by a solid line, and the associated luminous spots are characterized by solid bars; the pattern generated by the red beam is surrounded by dashed lines, and the associated luminous spots are shown with dashes; and lastly the pattern generated by the blue beam is surrounded by dots, and the associated luminous spots are drawn in as dotted stripes. If the three electron beams converged, the three patterns would essentially coincide. This is not the case, however. It is therefore of interest to measure the offset of the red and of the blue beams, in each case with respect to the green beam. For this purpose, the three positions of the three patterns must each be analyzed independently. This can be done, even with the use of a CCD sensor, by determining, before recording the pattern according to FIG. 5, which CCD pixels belong to which color. For this purpose, either the three electron beams are operated in succession in a preparation step, and the color to which each pixel corresponds is recorded; or all the electron beams are operated simultaneously, resulting in the H-shaped pattern of phosphor triplets according to FIG. 9, whose structure makes it possible to allocate pixels to the various colors. Both methods are known from the commercially available unit according to FIG. 7.

In measuring the vertical raster deviation, the deviation in the y direction from the horizontal center line HA of the field of view of the image converter must be detected for at least one beam, for example the green beam. As far as the vertical deviations of the other beams are concerned, reference can then be made either to the green beam or to the horizontal line HA. This analysis in the vertical direction can be made, for example, in the manner illustrated in FIG. 3.

It is thus possible, with the device according to the invention, to determine with a single recorded image all the convergence and raster position data for the x and y directions, for all three electron beams, with high precision. The only prerequisite, in addition to the said selection of the pattern, is that the field of view A of the CCD image converter must be set so that in the case of patterns offset with respect to each other, as depicted in FIG. 5, all the patterns will still lie within the field of view even at maximum manufacturing tolerance. When a CCD image converter 21 according to FIG. 8 is used, and when square patterns with an edge length of approximately 4 mm are used, this is possible with 1:1 imaging. If CCD image converters with smaller dimensions are used, or if tubes with extraordinarily large convergence and raster offsets need to be tested, the image of the pattern recorded by the camera must be reduced somewhat on the CCD image converter.

Figure 6:
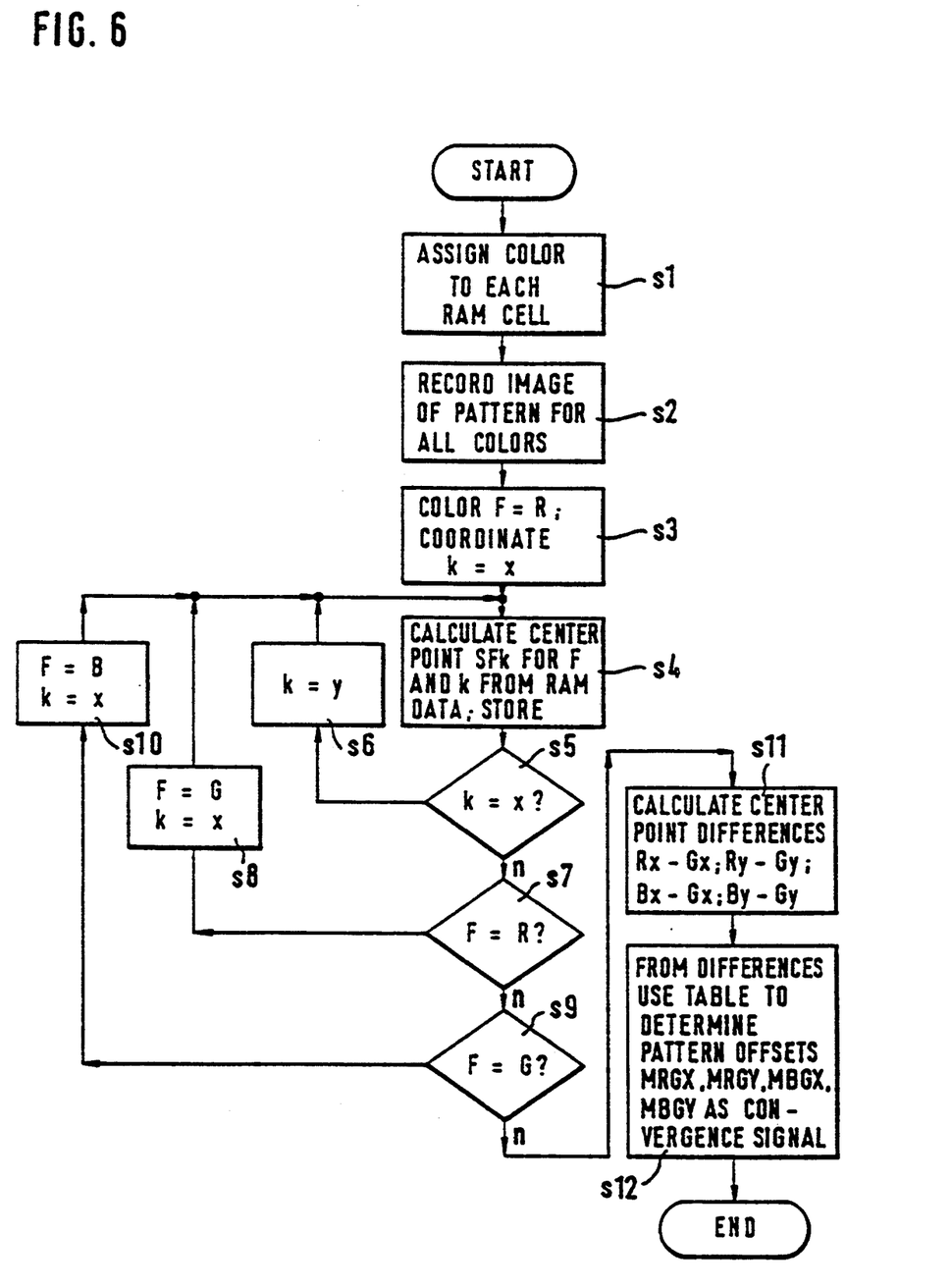
FIG. 6 is a flow diagram to explain a process as implemented by the device according to FIG. 1.

The flow diagram according to FIG. 6 illustrates how the process sequences described above succeed one another in the device according to FIG. 1. In a step s1, the correct color is assigned to each CCD pixel and thus also to each associated RAM cell, using one of the aforesaid processes. Then in a step s2, the three patterns for the three colors are displayed, resulting, for example, in an image such as the one displayed in FIG. 5. In a step s3, the color red R is set as the first color F being examined, and the x direction is selected as the coordinate k. With these data, the center point SFk for the color R and the coordinate x is calculated, as explained with reference to FIG. 2. The calculated value is stored (step s4). Then (step s5), a determination is made as to whether the coordinate has the value x. If this is the case, a step s6 is reached, in which the coordinate is set to the value y. Then step s4 is executed again, meaning that the center point SFk for the color R and the coordinate y is determined from the RAMdata, as illustrated with reference to FIG. 3. The calculated value is stored. Instead of the procedure just described, the x and y coordinates for the center point for the pattern for the color red can also be determined using the process explained with reference to FIG. 4.

If it is found in step s5 that the coordinate is not x, a step s7 queries whether the color is R. Since this is presently the case in this example, a step s8 is reached in which the coordinate k is again reset to the value x and the color is set to the value G. The center point is then determined for the G pattern, just as described for the R pattern. When step s7 is reached again, it is found that now the color is not R, leading to a step s9 which asks whether the color is green. Since this is the case, a step s10 is reached, in which the coordinate k is set back to the value x, and the color B is selected as the color. Once again the center point is determined in the aforesaid manner. When step s9 is reached again, it is found that now the color is not green, leading to a step s11 in which the center point differences between the center points for the red and the blue patterns, with respect to the center point for the green pattern, are calculated. Since the differences between the center points of the brightness distributions do not correspond exactly to the differences between the actual pattern center points, in a step s12 the differences between the coordinates of the center points of the brightness distribution patterns are converted into differences between the coordinates of the actual patterns.

The use of an image segment with edges running obliquely to the slot direction, especially the use of an image segment in the form of a square standing on one vertex, is known in another context from DE-A-32 06 913. The process described there does not, however, involve generating a pattern of that shape; instead vertical or horizontal raster lines are allowed to pass by a mask with that pattern. If vertical lines are involved and if a horizontal convergence error exists, the raster lines do not simultaneously enter the mask and exit from it, but rather these actions occur in succession. The use of the mask of the aforesaid shape leads to signals of increasing amplitude, from which an offset over time for the amplitude is extrapolated. This value indicates the convergence offset fairly accurately. However, the realizations leading to the use of the mask of the aforesaid shape in the aforesaid device are not usable in the present case, since here the time-related profiles are not being examined, and instead a single image of the particular pattern is being recorded, with that image then being analyzed.

We claim:

1. A process for measuring a position of an electron beam of a multiple-beam color picture tube relative to a field of view of an image converter, an electron beam generating system provides the electron beam which generates a brightness distribution pattern on a screen of a tube, the screen having phosphor stripes for different colors, and a shadow mask being arranged in front of the screen having elongated slots in the direction of the phosphor stripes, the process including the following steps:

generating a predefined electron distribution pattern on the shadow mask;

recording an associated brightness distribution pattern on the screen using the image converter, which converts the brightness distribution pattern into an electrical charge pattern; and analyzing the electrical charge pattern to obtain a value representing the position of the electrical charge pattern within the field of view of the image converter;

the process further characterized in that generating the electron distribution pattern having dimensions on an order of a few millimeters and having at least one edge extending obliquely to the direction of elongation of the elongated slots of the shadow mask; and imaging the associated brightness distribution pattern on the image converter to fit completely into the field of view.

2. A process according to claim 1, the process further characterized in that extending all of said at least one edges of the electron distribution pattern obliquely to the direction of elongation of the elongated slots of the shadow mask.

3. A process according to claim 2, the process further characterized in that positioning the electrical charge pattern within the image converter at a charge center point in a predefined direction.

4. A process according to claim 2, the process further characterized in that positioning an edge of the electrical charge pattern extending perpendicular to a predefined direction at the value representing the position of the electrical charge pattern within the field of view of the image converter, locating substantially all individual charges below a threshold in a region on one side of the edge, and locating substantially all individual charges above the threshold in a region on the other side of the edge.

5. A process according to claim 4, the process further characterized in that measuring the position with respect to one another of at least two electron beams, by:

choosing a scale for imaging the brightness distribution pattern on the image converter such that the entire brightness distribution pattern is imaged thereon;

determining the color of the phosphor from which light is being received for each pixel of the image converter;

generating the electron distribution pattern simultaneously for all the electron beams being measured, and recording image of the corresponding brightness distribution pattern by the image converter; and performing the analysis of the recorded image, in each case for two electron beams in two directions perpendicular to one another using the allocation of the pixels to the various electron beams.

6. A device for measuring a position of an electron beam of a multiple-beam color picture tube (11) relative to a field of view of an image converter (21), the electron beam generating a brightness distribution pattern on a screen (14) of the multiple-beam color picture tube (11), the screen (14) having phosphor stripes for different colors, and a shadow mask with elongated slots in the direction of the phosphor stripes and being arranged in front of the screen (14), having a pattern generator (10) to generate a predefined electron distribution pattern on the shadow mask;

an image converter camera (15) to record the associated brightness distribution pattern on the screen;

the image converter (21) to convert the brightness distribution pattern recorded by the camera into an electrical charge pattern;

an analysis arrangement (16) to analyze the charge pattern to obtain a value for a variable characterizing the position of the charge pattern within the field of view of the image converter (21); and a sequence controller (17) to control the sequences over time in the pattern generator (10), the image converter (21), and the analysis arrangement;

the device further characterized in that the pattern generator (10) generates an electron distribution pattern that has dimensions on an order of a few millimeters and has at least one edge extends obliquely to the direction of elongation of the elongated slots of the shadow mask; and the image converter camera (15) images the brightness distribution pattern on the image converter (21) to fit completely into the field of view.

7. A process according to claim 1, the process further characterized in that positioning the electrical charge pattern within the image converter at the charge center point in a predefined direction.

8. A process according to claim 1, the process further characterized in that positioning an edge of the charge pattern extending perpendicular to a predefined direction at the value representing the position of the electrical charge pattern within the field of view of the image converter, locating substantially all individual charges below a threshold in a region on one side of the edge, and locating substantially all individual charges above the threshold in a region on the other side of the edge.

9. A process according to claim 3, the process further characterized in that measuring the position with respect to one another of at least two electron beams by:

choosing a scale for imaging the brightness distribution pattern on the image converter such that the entire brightness distribution pattern is imaged thereon;

determining the color of the phosphor from which light is being received for each pixel of the image converter;

generating the electron distribution pattern simultaneously for all the electron beams being measured, and recording the image of the corresponding brightness distribution pattern by the image converter; and performing the analysis of the recorded image, in each case for two electron beams in two directions perpendicular to one another using the allocation of the pixels to the various electron beams.

10. A process according to claim 2, the process further characterized in that measuring the position with respect to one another of at least two electron beams, by:
- choosing a scale for imaging the brightness distribution pattern on the image converter such that the entire brightness distribution pattern is imaged thereon;
- determining the color of the phosphor from which light is being received for each pixel of the image converter;
- generating the electron distribution pattern simultaneously for all the electron beams being measured, and recording the image of the corresponding brightness distribution pattern by the image converter; and
- performing the analysis of the recorded image, in each case for two electron beams in two directions perpendicular to one another using the allocation of the pixels to the various electron beams.

11. A process according to claim 1, the process further characterized in that measuring the position with respect to one another of at least two electron beams, by:
- choosing a scale for imaging the brightness distribution pattern on the image converter such that the entire brightness distribution pattern is imaged thereon;
- determining the color of the phosphor from which light is being received for each pixel of the image converter;
- generating the electron distribution pattern simultaneously for all the electron beams being measured, and recording the image of the corresponding brightness distribution pattern by the image converter; and
- performing the analysis of the recorded image, in each case for two electron beams in two directions perpendicular to one another using the allocation of the pixels to the various electron beams.

* * * * *